United States Patent Office 3,515,750
Patented June 2, 1970

3,515,750
PREPARATION OF METHACRYLIC ACID
Günter Schröder, Ober-Ramstadt-Eiche, and Herbert Fink, Bickenbach, Germany, assignors to Rohm & Haas G.m.b.H., Darmstadt, Germany
No Drawing. Filed Oct. 11, 1966, Ser. No. 585,755
Claims priority, application Germany, Oct. 29, 1965, R 41,860
Int. Cl. C07c 57/04
U.S. Cl. 260—526                                    8 Claims

ABSTRACT OF THE DISCLOSURE

A process has been provided for preparing methacrylic acid from methacrylonitrile. This process comprises the steps of reacting methacrylonitrile with sulfuric acid in a molar ratio of 1:1 to 1.5, respectively, and water in a molar ratio based on sulfuric acid of 4.5 to 6.0:1, respectively, at a temperature from 70° C. to 200° C., optionally under pressure, and separating methacrylic acid as the top layer of the reaction mixture. A two step sequence can also be employed in which water is added after the addition of sulfuric acid and the reaction mixture is further reacted. The novel process can also be carried out in a pipe reactor zone. When utilizing this process, industrially attractive yields of methacrylic acid are obtained.

---

This invention relates to production of methacrylic acid; more specifically, this invention pertains to a highly efficient conversion of methacrylonitrile which is coupled with a recovery procedure giving excellent yields.

A known process for preparing carboxylic acids is the saponification (hydrolysis) of the corresponding nitrile precursor in the presence of strong acids or alkali agents. Aliphatic and aromatic acids can be prepared in an acceptable yield from their nitriles by conversion with sulfuric acid and water. (Cf. Houben-Weyl, volume 8, page 429, 1952.) If this process is used on acrylonitrile, then only a small portion of acrylic acid is obtained, the main product being hydracrylic acid as well as a mixture of hydracrylic acid oligo ester of the general formula

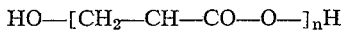

$$HO—[CH_2—CH—CO—O—]_nH$$

in which $n$ signifies an average believed to lie between 5 and 10. From this oligomer mixture acrylic acid is obtained when the oligo ester is thermally decomposed under vacuum at a temperature up to 200° C. A part of the oligo ester resinifies at these drastic conditions, so that the yields are only from 60 to 80% of the theoretical.

It has been found that methacrylonitrile behaves altogether differently from acrylonitrile when it is converted with at least one mole equivalent of sulfuric acid and at least 2 mole equivalents of water; thus, no oligo ester, but instead, monomeric methacrylic acid is formed in high yields. This is especially unexpected because in other reactions which are expected in view of the considerable overlap of the structure of the two compounds, acrylonitrile and methacrylonitrile behave similarly, e.g., by conversion to an amide with sulfuric acid and a molar equivalent of water, or by conversion to the corresponding ester with sulfuric acid, water and alcohol.

Since the advent of the production of methacrylonitrile by ammoni-oxydation of isobutylene, the production of methacrylic acid (and its ester) from the methacrylonitrile has assumed increased interest. However, the economic considerations of that process up to now have been substantially restricted in that only in the presence of large excess amounts of water a technically satisfactory conversion rate could be achieved. This procedure not only required conversion vessels of considerable size, but also the obtained methacrylic acid dissolved in considerable amount in the water phase, and the acid had to be extracted or removed by fractional distillation from the water phase. If only a slight amount of excess water were used, the obtained methacrylic acid separated nearly completely as the upper layer; however, the conversion took a long time.

In the following table the times are given in which a mixture of methacrylonitrile, a slight excess of sulfuric acid, and water reaches a conversion of 95% of that of the theoretical.

TABLE I.—LENGTH OF TIME TO ACHIEVE 95% CONVERSION

| Amount of water in moles per mole of methacrylo-nitrile | Duration of conversion to reach 95%, in hours | Recovery of methacrylic acid from the upper phase in percent of theoretical yield |
|---|---|---|
| 2.5 | 5.5 | 97 |
| 4   | 4.75 | 97 |
| 6.5 | 4.1 | 91 |
| 9   | 3.6 | 80 |
| 11  | 2.4 | 71 |

In accordance with the present invention, the problem has now been solved in that in a shorter reaction time methacrylonitrile is hydrolyzed in such a manner that the produced methacrylic acid is obtained in the upper phase of the reaction mixture in higher yields.

The discovery rests on the fact that in a small range of molar ratio of water to sulfuric acid the hydrolysis of the methacrylonitrile takes place unexpectedly fast.

In this range, the amount of excess water is still so slight that after the end of the reaction, the amount of methacrylic acid in the water phase is negligible, and practically the total amount of methacrylic acid can be separated as the upper phase.

Pursuant to the invention, preferably under pressure, and at a temperature of 70 to 200° C., methacrylonitrile is converted with 1 to 1.5 moles of sulfuric acid per mole of methacrylonitrile and 4.5 to 6 moles of water per mole of sulfuric acid, and the formed methacrylic acid separated as the upper phase. If, for example, as illustrated in the table below, 1 mole of methacrylonitrile is allowed to react with 1.1 moles of sulfuric acid together with water, again on the basis of 1 mole sulfuric acid, the time in which a conversion of 95% can be reached changes in respect to the amount of water as indicated.

TABLE II.—EFFECT OF WATER ON CONVERSION RATE

| Water moles on basis of 1 mole of $H_2SO_4$ used | Conversion in hours to reach 95% | Percent recovery (of that of theoretical) of methacrylic acid from the upper phase |
|---|---|---|
| 4.1 | 4.5 | 97 |
| 4.5 | 2.7 | 96 |
| 4.7 | 2.0 | 98 |
| 4.9 | 1.9 | 96 |
| 5.2 | 2.6 | 97 |
| 5.5 | 3.9 | 95 |
| 6.2 | 4.1 | 94 |

The process can be practiced with some success if larger amounts of sulfuric acid as the 1.5 moles of sulfuric acid per mole of methacrylonitrile are employed; however, then the range in which the fast conversion takes place in less pronounced, while the reaction rate with increasing sulfuric acid concentration increases in respect to all proportions of the mixture. Nevertheless, from the economic standpoint, it is disadvantageous to utilize more as 1.5 moles of sulfuric acid per mole of methacrylonitrile not only due to the increasing use of sulfuric acid but also because the disposal of the larger amounts of the strongly acidic aqueous phase becomes very expensive.

According to the invention, the basic reaction can be carried out in a different manner, for example, to concentrated sulfuric acid methacrylonitrile and water can be simultaneously added, or in a first reaction step methacrylonitrile converted with sulfuric acid and in a second reaction step water added thereto. Advantageously, the sulfuric acid can be adjusted with water to appropriate concentration and then used to convert the methacrylonitrile by either adding the last to the acid or vice versa. In practice, it has been found advantageous to carry out the reaction in two steps. In the first step, methacrylonitrile is converted with sulfuric acid and water—up to 1.2 moles of water per mole of methacrylonitrile to be converted. As soon as this reaction is finished, in the second conversion step water is added in the same amount so that altogether per mole of sulfuric acid 4.5 to 6 moles of water is added, and the reaction allowed to proceed to complete hydrolysis of the methacrylonitrile.

The reaction rate is increased in the conventional manner by raising the temperature. The temperature limits are delimited on one end by the very low temperatures at which the conversion is uneconomically slow and on the other end by the unduly high temperature at which resinification takes place.

The reaction of methacrylonitrile with sulfuric acid is rather exothermic and is not securely controllable by the rate at which the reactants are added. If the temperature is too low, such as room temperature, no reaction takes place and the unreacted methacrylonitrile and sulfuric acid are in contact with each other. As soon as the temperature is raised to where the reaction takes place, the reaction mixture heats itself so that the conversion takes place with explosive rapidity. This problem is avoided when working at a temperature of at least 70° C. In practice the reaction is carried out between 90 and 110° C.; however, the conversion temperature can be raised to 200° C., for example, when the reaction is carried out in a pipe reactor with the conversion times of few seconds.

If the process is carried out in two steps, the above-discussed considerations apply to the first step; while the second step can be carried out at any desired temperature; in the interest of an economically short conversion time, it is preferable to carry out the process at higher temperatures such as over 100° C. With especial advantage, the second step is carried out in a pressure vessel at a temperature of 100 to 150° C. At these working conditions, for the two conversion steps about one hour is required.

The reacted and cooled reaction mixture consists of two layers. The upper one consists of 95 to 99% methacrylic acid with small amounts of water and ammonia salts as impurities.

The lower level is, depending on the amount of water being used, a more or less concentrated aqueous solution of ammonium hydrogen sulfate which contains about one half percent methacrylic acid.

The yield, on the basis of raw methacrylic acid, is as a rule nearly quantitative, so that purified yields can be obtained of more than 95% of the theoretical yield.

EXAMPLE 1

A mixture of 107.8 grams (1.1 moles) of 100% sulfuric acid, 14.4 grams (0.8 mole) water and 0.7 gram copper sulfate pentahydrate (polymerization inhibitor) is heated to 95° C. in a 500 ml. round flask equipped with stirrer, reflux condenser, thermometer and drop funnel. 67 grams (1 mole) methacrylonitrile are fed into the flask with stirring at such a rate that the temperature can be held in the reaction vessel between 90° C. and 100° C. The addition of nitrile is concluded after 45 minutes. The total reactant mixture is further heated for one hour at 100° C. Finally, 75.6 grams (4.2 moles) of water are added, and the mixture is stirred for four hours at 100° C. The reaction mixture is cooled whereby two layers form, which layers are separated in a separating funnel. The upper phase contains no sulfate and no ammonium ions, and is 96% methacrylic acid according to acid number and bromine number determination. This amount corresponds to a yield of 93.0% of that of the theoretical yield (based on the introduced methacrylonitrile). By steam distillation of the lower phase an additional 1.9% (of theor.) of methacrylic acid is obtained, so that the total yield of methacrylic acid is 94.9% of that of the theoretical yield (based on the introduced methacrylonitrile). According to ammonium analysis of the lower aqueous phase, a total yield of 96.3% of that of the theoretical is obtained.

EXAMPLE 2

Into a 500 ml. round flask equipped with a stirrer, cooler, thermometer and two drop funnels, 107.8 grams (1.1 moles) of 100% sulfuric acid and 0.7 gram of copper sulfate pentahydrate are introduced and are heated to 95° C. Within 45 minutes 67 grams (1.0 mole) methacrylonitrile and 18 grams (1 mole) water are added simultaneously to the above mixture at such a rate that the reaction temperature can be held between 90° and 100° C. Additionally, the reaction mixture is heated for one hour at 100° C., and next after addition of 72 grams (4 moles) of water stirred at 100° C. for 4 hours. Finally, the mixture is worked up as illustrated in Example 1. In this experiment, the total yield of methacrylic acid is 92.8% of the theoretical (based on the introduced methacrylonitrile). An ammonium analysis of the lower phase showed a total yield of 92.4% of that of the theoretical yield.

EXAMPLE 3

Into a 150 liter glass-lined pressure vessel equipped with stirring means, cooler, thermometer and feed vessel, 50.3 kg. of 85.7% sulfuric acid (440 moles sulfuric acid, 400 moles water) and 1 kg. of copper sulfate pentahydrate are introduced and are heated to 95° C. 26.8 kg. (400 moles) methacrylonitrile are then added with stirring at such a rate that the temperature in the reaction vessel does not fall below 90° C. and does not go above 100° C. After 55 minutes, the addition of methacrylonitrile is finished. The reaction mixture is then further heated for one hour at 98° C. to 100° C. Finally, for further hydrolysis, 36 kg. (2000 moles) of water are added and the total mixture is stirred at 100° C. for four hours. After cooling, two layers are formed which are separated from each other. The upper organic layer weighs 34.3 kg. and is 97% methacrylic acid according to acid number and bromine number determination. It corresponds to a yield of 96.8% of that of the theoretical yield (based on the introduced methacrylonitrile). The lower aqueous layer weighs 79.9 kg. and contains additional 2.3% of that of the theoretical yield of methacrylic acid so that the total yield of methacrylic acid is 99.1% of the theoretical (based on the introduced methacrylonitrile). An ammonium analysis of the lower layer gives a quantitative conversion.

Vacuum distillation of the upper organic layer allows an isolation of 94% of pure methacrylic acid.

EXAMPLE 4

The conversion of methacrylonitrile with sulfuric acid and water is repeated according to Example 3 with the distinction that only 0.25 kg. of copper sulfate pentahydrate is added as a stabilizer, and the hydrolysis of the heated mixture is carried out with 28.8 kg. (1600 moles) of water. The obtained, upper organic layer weighs 34.4 kg. and is 97% methacrylic acid. It corresponds to a yield of 97% of that of the theoretical yield (based on the introduced methacrylonitrile). The lower aqueous layer weighs 71.6 kg. and contains an additional 2.3% (of theor.) methacrylic acid so that the total yield is 99.3% of that of the theoretical yield (based on the introduced methacrylonitrile). An ammonium analysis of the lower phase gives a total yield of 100% of that of the theoretical yield.

EXAMPLE 5

The conversion of methacrylonitrile with sulfuric acid and water is repeated according to Example 4 with the distinction that after heating of the reaction mixture and addition of 28.8 kg. (1600 moles) water the glass-lined vessel is closed pressure-tight, and the further hydrolysis conducted for two hours at 120 to 130° C. The work-up is carried out in the same manner as in Example 4. The upper, organic phase weighs 33.7 kg. and is 98% methacrylic acid. It corresponds to a yield of 96.4% of that of the theoretical yield (based on the introduced methacrylonitrile). The lower aqueous phase weighs 72.0 kg. and contains a further 1.5% (of theor.) of methacrylic acid so that the total yield is 97.9% (of theor.) (based on the introduced methacrylonitrile). An ammonium analysis of the lower aqueous phase gives a total yield of 98.2% of that of the theoretical yield.

What is claimed is:

1. A process for preparing methacrylic acid from methacrylonitrile consisting essentially of the steps of: (a) reacting methacrylonitrile with sulfuric acid in a molar ratio of 1:1 to 1.5, respectively, and water in a molar ratio based on sulfuric acid of 4.5 to 6.0:1, respectively, at a temperature from 70° C. to 200° C., and (b) separating methacrylic acid as the top layer of the reaction mixture.

2. A process for preparing methacrylic acid from methacrylonitrile consisting essentially of the steps of: (a) reacting at a temperature from 70° C. to 200° C. methacrylonitrile with sulfuric acid in a molar ratio of 1:1 to 1.5, respectively, and up to 1.2 moles of water on the basis of methacrylonitrile, (b) adding to the mixture a step (a) water to bring the total water within a molar ratio of 4.5 to 6 based on one mole of sulfuric acid, (c) further reacting the water-containing mixture, and (d) separating as a top layer of the mixture methacrylic acid.

3. The process according to claim 2 wherein the mixture is further reacted in step (c) at a temperature between 100 and 150° C. and under at least the autogenous pressure.

4. The process according to claim 1 wherein the reaction is conducted in a pipe reactor zone.

5. A process according to claim 2 wherein the total amount of added water is from 4.5 to 5.2 moles per mole of sulfuric acid, the total reaction time from 2.7 to 2.6 hours and the percent of methacrylic acid recovered from the upper layer is at least 94 percent of that of the theoretical yield.

6. The process according to claim 1 wherein the sulfuric acid used is a 100% sulfuric acid.

7. The process according to claim 2 wherein the sulfuric acid is used together with the specified amount of water in step (a) as a diluted acid.

8. The process according to claim 1 and wherein the reaction is carried out under pressure.

References Cited

UNITED STATES PATENTS 3,320,305   5/1967   Wiese _____ 260—526

JAMES A. PATTEN, Primary Examiner